US008150578B2

(12) United States Patent
Saen et al.

(10) Patent No.: US 8,150,578 B2
(45) Date of Patent: Apr. 3, 2012

(54) VEHICLE ELECTRONIC SYSTEM AND VEHICLE

(75) Inventors: Makoto Saen, Kodaira (JP); Kenichi Osada, Tokyo (JP); Shigeru Oho, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 648 days.

(21) Appl. No.: 12/335,984

(22) Filed: Dec. 16, 2008

(65) Prior Publication Data

US 2009/0157252 A1 Jun. 18, 2009

(30) Foreign Application Priority Data

Dec. 17, 2007 (JP) ................................ 2007-324172

(51) Int. Cl.
*G06F 7/00* (2006.01)

(52) U.S. Cl. ........................................................ 701/33

(58) Field of Classification Search .................... 701/33, 701/35, 36
See application file for complete search history.

(56) References Cited

U.S. PATENT DOCUMENTS

| | | | | |
|---|---|---|---|---|
| 7,590,768 | B2 * | 9/2009 | Gormley | 710/8 |
| 7,596,636 | B2 * | 9/2009 | Gormley | 710/8 |
| 2005/0187677 | A1 * | 8/2005 | Walker | 701/16 |
| 2009/0059810 | A1 * | 3/2009 | Kawai et al. | 370/252 |

FOREIGN PATENT DOCUMENTS

| | | | |
|---|---|---|---|
| JP | 10-200054 | A | 7/1998 |
| JP | 2007-15413 | A | 1/2007 |

* cited by examiner

*Primary Examiner* — Faye M. Fleming
(74) *Attorney, Agent, or Firm* — Miles & Stockbridge P.C.

(57) ABSTRACT

In a vehicle electronic system including a plurality of LSI boards, LSIS which cannot control a user interface such as image or audio directly issue a command for notifying a vehicle occupant of its own information via networks and an information control LSI receives the request to output a message. A mechanism for setting priority of processings regarding LSI status information notification to be lower than that of an apparatus control processing is provided in each of LSIs and networks so that real-time property of the apparatus control processing is maintained. In order to reduce network load regarding the LSI status information notification, a message content itself is stored in a memory in a vehicle information processing unit previously so that only an ID for identifying the message content is transmitted.

12 Claims, 10 Drawing Sheets

| Processing Classification | Priority |
|---|---|
| Apparatus Control { Cycle Task / Event Driven Task (Including Communication) } | ↑ High |
| Redundant Computation Task | |
| LSI Status Reflection Task CTRLPGM (Temperature, Operating Speed, etc.) | |
| Diagnosis Task | Low |

| Processing Classification | Priority |
|---|---|
| Normal Processing Task Such As Apparatus Control And Communication Control | ↑ High |
| LSI Status Notification Transfer Task | |
| Diagnosis Task | Low |

FIG. 6

PRTBL

| Processing | Executable Module | | Power Budget (mW) | Operation After Processing Interruption | Execution Source Shift | Processing Priority | | Processing Allocation (Latest) |
|---|---|---|---|---|---|---|---|---|
| | | | | | | Emergency Stop Temperature | Processing Suppression Temperature | |
| Route Search | Main | CPU1 \| CPU2 | 60 | Resume | Possible | Stop | 6 (High) | CPU1 |
| | Other | — | 5 | | | | | |
| Navigation (Display) | Main | CPU1 \| CPU2 | 100 | Resume | Possible | Stop | 5 (High) | CPU1 |
| | Sub | Image Drawing Module | 100 | | | | | |
| | Other | — | 10 | | | | | |
| Audio Output (Including Synthetic) | Main | CPU1 \| CPU2 | 10 | Erase | Possible | Stop | 6 (High) | CPU1 |
| | Sub | DSP | 20 | | | | | |
| | Other | — | 5 | | | | | |
| Radio Music Play | Main | CPU1 \| CPU2 \| CPU3 | 10 | Erase | Possible | Stop | 3 (Middle) | CPU2 |
| | Sub | DSP | 20 | | | | | |
| | Other | — | 5 | | | | | |
| TV | Main | CPU1 \| CPU2 \| CPU3 | 50 | Erase | Possible | Stop | 0 (Low) | CPU2 |
| | Sub | Moving Picture Codec Module | 200 | | | | | |
| | Other | — | 40 | | | | | |
| Image Recognition | Main | CPU3 | 100 | Erase | Impossible | Stop | 6 (High) | CPU3 |
| | Sub | Image Recognizing Module | 200 | | | | | |
| | Other | — | 10 | | | | | |
| Audio Recognition | Main | CPU2 \| CPU3 | 50 | Erase | Possible | Stop | 6 (High) | CPU3 |
| | Sub | DSP | 50 | | | | | |
| | Other | — | 5 | | | | | |
| Control Unit Communication | Main | CPU0 \| CPU1 | 10 | — | Possible | Continue | 7 (High) | CPU0 |
| | Other | — | 5 | | | | | |
| User Input Response | Main | CPU0 \| CPU1 | 5 | — | Possible | Continue | 7 (High) | CPU0 |
| | Other | — | 5 | | | | | |
| • LSI Status Notification Output (Own/Other LSI)<br>• Performance Control Corresponding To Own LSI | Main | CPU0 \| CPU1 | 5 | — | Possible | Continue | 7 (High) | CPU0 |
| | Other | — | 5 | | | | | |

VEHICLE ELECTRONIC SYSTEM AND VEHICLE

CROSS-REFERENCE TO RELATED APPLICATION

The present application claims priority from Japanese Patent Application No. JP 2007-324172 filed on Dec. 17, 2007, the content of which is hereby incorporated by reference into this application.

TECHNICAL FIELD OF THE INVENTION

The present invention relates to a vehicle electronic system including many semiconductor integrated circuits.

BACKGROUND OF THE INVENTION

Currently, introduction of electronics to vehicles has been advanced and parts which had been mechanically controlled in the past, including engine, brake, and so forth have been replaced by electronically controlled parts. Securement of reliability is the most important factor for vehicle-mounted systems, and high reliability is required for vehicle electronic systems. The same goes for a large scale integration (LSI) circuit which is the heart of the vehicle electronic system, and it is designed so as to ensure sufficient reliability. However, problems which cannot be evaluated in an initial test may occur. Such problems include thermorunaway caused when an ambient environment has reached to a higher temperature state than supposed, degradation due to operation speed degradation and aging degradation, etc.

As means for solving such problems, there is a case where a circuit for observing status of an LSI such as temperature and operation speed is integrated within the LSI so that control is performed according to values obtained by the circuit. As control regarding temperature, an approach of lowering performance in a high temperature state to ensure reliability has been proposed. Japanese Patent Application Laid-Open Publication No. H10-200054 (Patent Document 1) describes an approach where, when a temperature of an LSI exceeds a certain fixed temperature, reliability is ensured by omitting a processing to lower an operating frequency. It is also described that an alarm lamp is lighted in that case. Japanese Patent Application Laid-Open Publication No. 2007-15413 (Patent Document 2) describes a software approach such that, when abnormality of a cooling fan is detected in a vehicle-mounted information system in which a navigation function, an audio function, an emergency notification function, an air conditioner control function, etc. are integrated, processing contents are limited so that heat generation is suppressed. It is also described that a message is conveyed to a user via display or audio to tell that the processing contents is limited.

SUMMARY OF THE INVENTION

As described above, it is effective with respect to problems which cannot be evaluated in the initial test to adopt an approach of integrating an observing circuit on the LSI and controlling an operation of the observing circuit according to a status of the LSI. However, such an action is consistently supplemental, and especially, when a failure occurs in an apparatus control side of such as brake and engine, repair is required, essentially. Here, in Patent Document 1, the apparatus itself conveys a massage to a vehicle occupant by lighting a controllable alarm lamp. On the contrary, in Patent Document 2, when abnormality occurs in the cooling fan or the like and temperature rising is observed, the LSI notifies a user or a passenger on the vehicle of the fact that a function control processing is performed by using its own controllable function. That is, each of Patent Documents discloses that the LSI detects abnormality in parts to be controlled by the LSI itself and conveys the abnormality to a user by using means which can be controlled by the LSI. In a current vehicle system, an LSI for controlling a brake, an engine, or the like and an LSI for performing control of a car navigation apparatus, an audio apparatus outputting display and audio are configured by different LSIs. Therefore, even though means for conveying the abnormality in more detail such as the car navigation apparatus, the audio apparatus, etc. are provided, when abnormality occurs in the LSI performing apparatus control on a brake, an engine etc., simple notification means such as an alarm lamp is used like described in Patent Document 1. Here, if information can be conveyed by using the car navigation apparatus, the audio apparatus, etc. in more detail instead of the simple notification means such as an alarm, convenience for a user will be further improved, but currently, no such means are provided.

The typical ones of the inventions disclosed in the application will be briefly described as follows.

A vehicle electronic system or a vehicle comprises: a plurality of apparatus control unit LSIs which include a monitoring circuit observing its own temperature information and operation speed information, and controls a corresponding movable apparatus part; a plurality of information processing LSIs which control an image display device or an audio output device; an apparatus control system network connected to the plurality of apparatus control unit LSIs; an information processing system network connected to the information processing LSIs; and a gateway LSI connected between the apparatus control system network and the information processing system network, where the plurality of apparatus control unit LSIs notify the gateway LSI of first abnormality information via the apparatus control system network upon detecting operation abnormality based on a monitoring result obtained by the monitoring circuit, the gateway LSI notifies the information processing LSI of second abnormality information based on the first abnormality information via the information processing system network upon receiving the first abnormality information from one of the plurality of apparatus control unit LSIs, and the information processing LSI outputs a message based on the second abnormality information to the image display device or the audio output device upon receiving the second abnormality information.

In addition, it is preferable to determine a massage to output not by the first abnormality information and the second abnormality information as they are, but by coding the information and looking up a table in an information processing unit.

Further, it is preferable that execution priority of a task for outputting the first abnormality information is set to be lower than that of a task for normal operation.

Still further, it is preferable to prepare an arbitration system 1 for assigning a right of use to each apparatus control unit LSI at a predetermined cycle, and an arbitration system 2 for assigning a right of use according to priority in the apparatus control system network, so that the first abnormality information is conveyed by using the arbitration system 2. In this case, the priority of the first abnormality is preferably set to be lower than that of normal communication.

Also, it is preferable to provide a sub LSI corresponding to the apparatus control unit LSI, and when it is detected that abnormality occurs in the apparatus control unit LSI, some of processings to be performed in the apparatus control unit LSI are executed by the sub LSI.

Moreover, it is preferable that the apparatus control unit LSI stores temperature information observed by the monitoring circuit, and the first abnormality information is outputted when an accumulated time of predetermined temperature abnormality exceeds a predetermined value.

Finally, it is preferable that the temperature information is stored in a nonvolatile memory and it can be read externally in maintenance.

According to an effect of the present invention, reliability of a vehicle-mounted system can be improved.

BRIEF DESCRIPTIONS OF THE DRAWINGS

FIG. 6 is a diagram showing processing priority in the information processing unit;

DESCRIPTIONS OF THE PREFERRED EMBODIMENTS

First Embodiment

Figure 1:
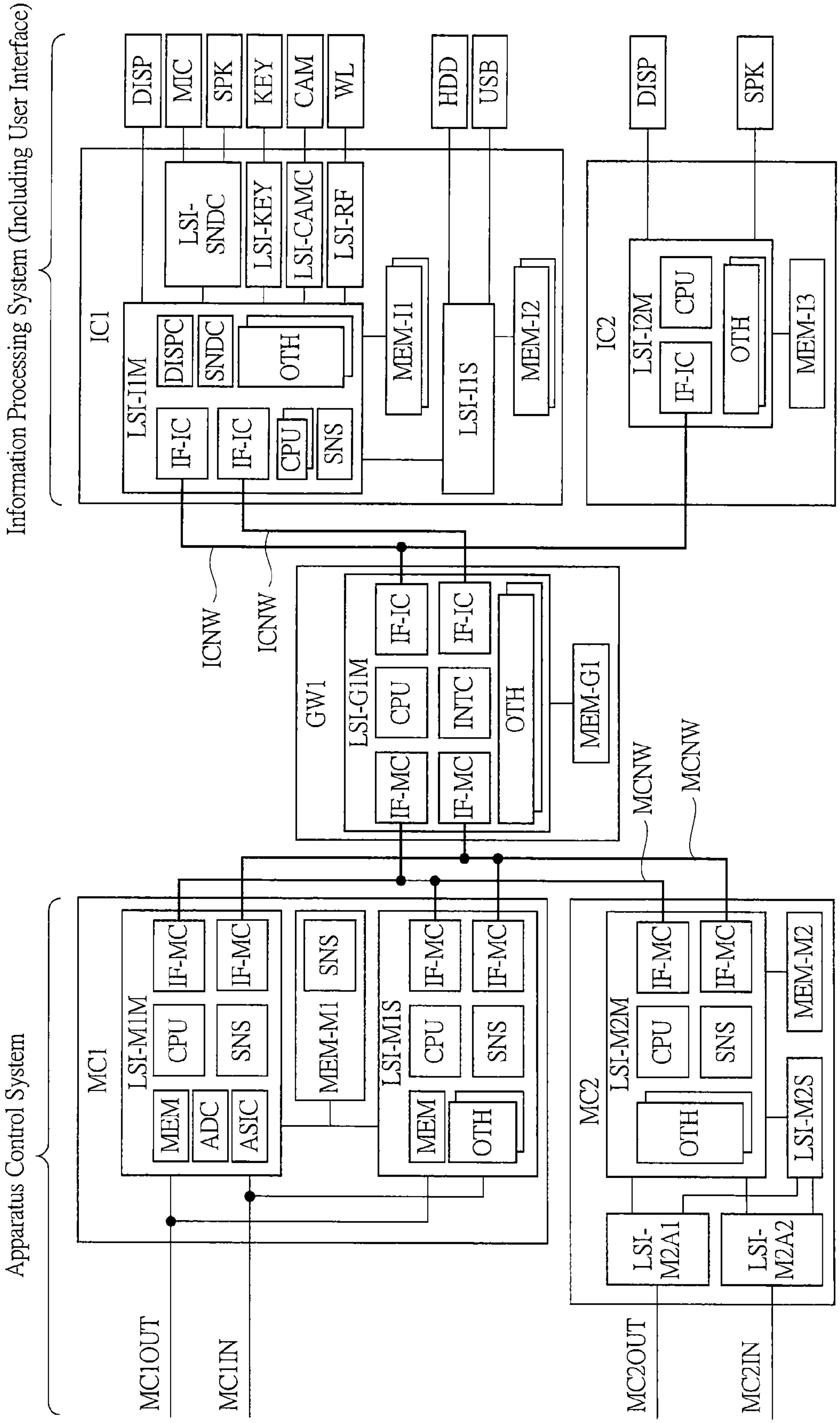
FIG. 1 is a configuration diagram of a vehicle electronic system.

FIG. 1 is a diagram showing a configuration of a vehicle electronic system according to a first embodiment of the present invention. The system comprises: an apparatus control system which performs control of movable apparatus parts such as an engine or a brake; an information processing system which controls an image display device or an audio output device which is a user interface such as an audio system or a navigation system; and a gateway unit (GW1) positioned between the apparatus control system and the information processing system. The apparatus control system includes a plurality of apparatus control units MC1 and MC2 corresponding to respective movable apparatus parts. The information processing system includes a plurality of information processing units IC1 and IC2 corresponding to respective user interfaces. The plurality of apparatus control units (MC1 and MC2) and the gateway unit are connected utilizing an apparatus system network (MCNW), and the plurality of information processing units (IC1 and IC2) and the gateway unit (GW1) are connected utilizing an information system network (ICNW). Here, the information processing system indicates parts handling image data and audio data, and a network connected to the parts is called "information system network." The car navigation apparatus and the audio apparatus corresponds to the information processing system. The apparatus control system indicates parts for controlling movable parts such as an engine, a brake, a handle, and a door, and a network connected with these movable parts is called "apparatus control system network." A unit connected to both the networks and serving to allow information transmission is called "gateway unit." Note that, apparatuses configuring the respective networks are not limited to apparatuses mentioned above and for example a control unit of a movable part such as a door may be connected to the information system network. Herein, a network including apparatuses which output images and audio data items, such as the car navigation apparatus and the audio apparatus is called "information system network (or information processing system)," and the other network is called "apparatus control system network (or apparatus control system)."

The apparatus control unit comprises a plurality of units corresponding to apparatuses to be controlled and it comprises the apparatus control units MC1 and MC2 in FIG. 1. MC1 includes a main LSI (LSI-M1M) mainly performing control, a sub LSI (LSI-M1S) assisting operation of the main LSI, and a memory (MEM-M1). LSI-M1M includes a communication IF (IF-MC) for connection to the apparatus control system network, CPU, an LSI status monitoring circuit (SNS) for monitoring temperature and operation speed of LSI, a built-in memory (MEM), an AD converter (ADC), and a dedicated circuit ASIC. LSI-M1S includes a communication IF (IF-MC) for connection to the apparatus control system network, CPU, an LSI status monitoring circuit (SNS), a built-in memory (MEM), and the other circuit blocks (OTH). The memory MEM-M1 also includes an LSI status monitoring circuit (SNS) for monitoring temperature, operation speed of LSI, and the like. MC2 includes an LSI (LSI-M2M) mainly performing control, an LSI (LSI-M2S) assisting operation of LSI-M2M, a memory (MEM-M2), and LSI-M2A1 and LSI-M2A2 which are LSIs for connecting LSI-M2M and LSI-M2S to apparatuses to be controlled. LSI-M2M includes a communication IF (IF-MC), a CPU, an LSI status monitoring circuit (SNS), and other circuit blocks (OTH). Here, the abovementioned LSI status monitoring circuit (SNS) has a mechanism which can look up monitored LSI status values obtained by SNS from CPU within the apparatus control unit. LSI including the communication IF (IF-MC) for connection to the apparatus control system network can produce a command based on the looked-up LSI status from the SNS to perform write to a register in the communication IF (IF-MC), thereby transmitting the produced command.

LSI in the gateway unit includes a communication IF (IF-MC) for connection to the apparatus control system network, a communication IF (IF-IC) for connection to the information network, CPU, an interruption controller INT, and other circuit blocks (OTH).

The information processing system also comprises a plurality of units and it comprises the apparatus control units IC1 and IC2 in FIG. 1. IC1 includes an LSI (LSI-I1M) mainly performing processing, an LSI group (LSI-I1S, LSI-SNDC, LSI-KEY, LSI-CAMC, LSI-RF) assisting operation of the LSI, and memories (MEM-I1, MEM-I2). LSI-I1M includes a communication IF (IF-IC) for connection to the information system network (ICNW), a CPU, an LSI status monitoring circuit (SNS), a screen display control block (DISPC) for performing screen display, a sound/voice input and output control block (SNDC) for outputting audio to a speaker, and other circuit blocks (OTH). Here, DISP indicates a display, MIC indicates a microphone, SPK indicates a speaker, KEY indicates a keyboard, CAM indicates a camera, WL indicates a wireless antenna, HDD indicates a hard disk, and USB indicates a USB port. IC2 comprises an LSI (LSI-I2M) mainly performing a processing and a memory MEM-I3.

Here, an operation in the case where an abnormality occurs in the apparatus control unit MC1 will be described. Note that, since respective operations will be described later, only a whole flow will be described here. When the apparatus control unit MC1 detects an operation abnormality based on a monitoring result obtained by the LSI status monitoring circuit, it outputs abnormality information to the gateway unit via the communication IF (IF-MC) and the apparatus control system network. The gateway unit GW1 outputs the abnormality information to the information processing IC1 via the communication IF (IF-IC) and the information processing system network based on the abnormality information transmitted from the apparatus control unit MC1. The information processing unit IC1 which has received the abnormality information causes a corresponding display device to display a message based on the abnormality information or causes a corresponding audio output device to output a message based on the abnormality information.

According to the configuration described above, LSI inside the apparatus control system can notify a vehicle occupant of information about its own temperature, operation speed or the like via the apparatus control system network, the gateway unit, the information processing system network, and the information processing system as more specific information such as a message without using simple known means such as a warning lamp. Accordingly, for example, the vehicle occupant can go to an automobile dealer in an early stage for vehicle maintenance. Operations of respective components will be described below.

Figure 2:
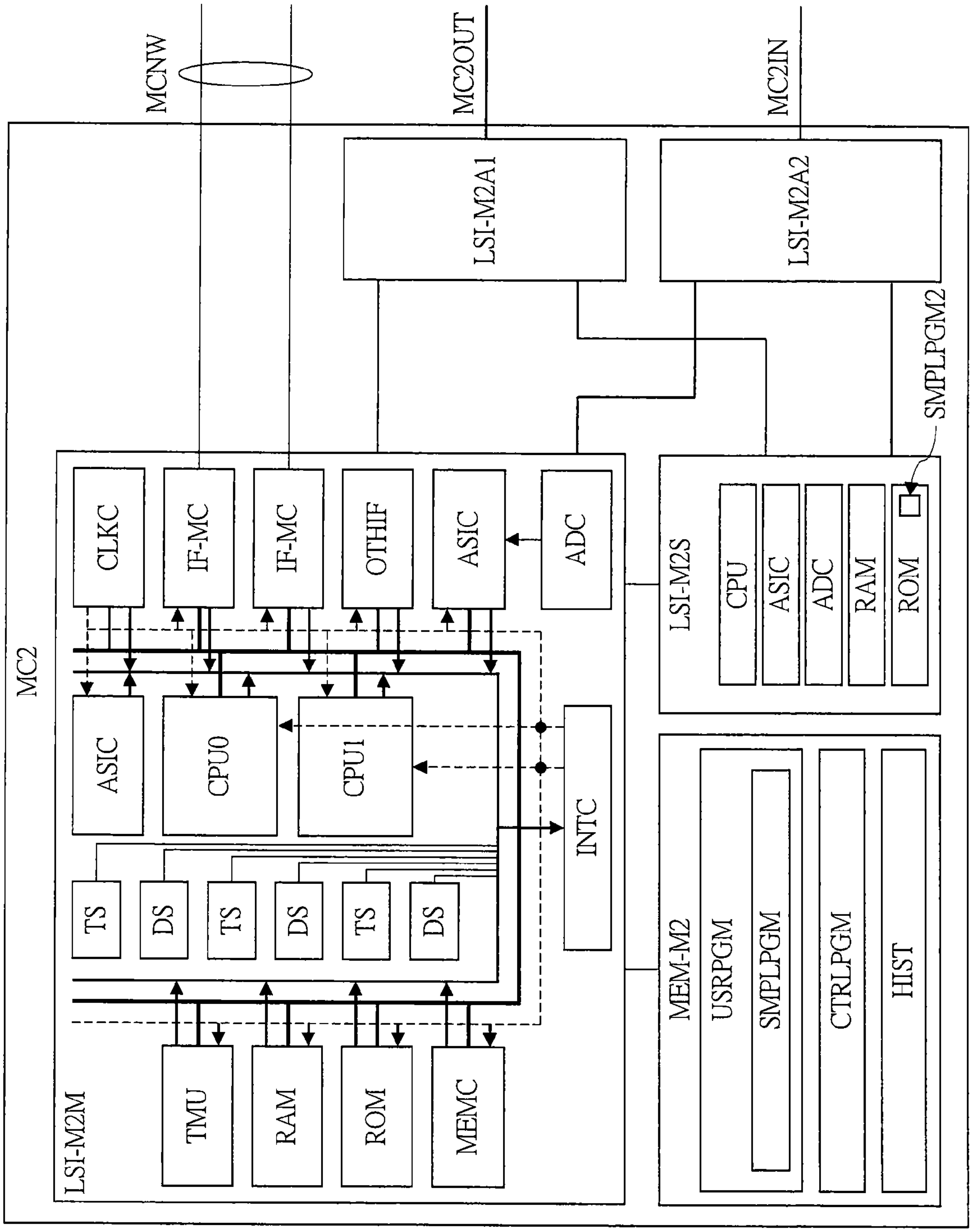
FIG. 2 is a block diagram of an apparatus control unit.

FIG. 2 shows one example of the apparatus control unit (corresponding to the apparatus control unit MC2 in FIG. 1). Main functions of the main LSI (LSI-M2M) and the sub LSI (LSI-M2S) for ensuring reliability are to output a control signal (MC2OUT) to an apparatus to be controlled based on information (MC2IN) obtained by sensing an operation state of the apparatus, and it is required a high reliability. LSI-M2S includes two CPUs (CPU0 and CPU1), a dedicated circuit block (ASIC), a timer (TMU), an on-chip RAM, an on-chip ROM, a memory controller (MEMC), an interruption controller (INTC), a communication IF (IF-MC), a clock control unit (CLKC), various output interfaces (OTHIF), and an AD converter (ADC). LSI-M2M includes temperature monitoring circuits TS sensing temperature of LSI and operation speed detecting circuits DS monitoring operation speed of LSI corresponding to the LSI status monitoring circuit (corresponding to SNS in FIG. 1). The temperature monitoring circuit TS issues a temperature-induced performance suppression/suppression cancelling interruption to CPU (CPU0 or CPU1) inside the main LSI via the interruption control circuit INTC when a temperature change crossing a set temperature occurs. As the temperature-induced performance suppression/suppression cancelling interruption, there are a temperature-induced performance suppression interruption which is issued when temperature rising exceeding the set temperature occurs and a suppression cancelling interruption which is issued when temperature falling passes through the set temperature occurs. The operation speed monitoring circuit DS is for monitoring degradation of the operation speed of LSI due to process degradation or the like and DS issues an operation speed change interruption to CPU inside the main LSI when a change of the operation speed of LSI crossing a preset value occurs. The plurality of DSes and the plurality of TSes are provided for observing a plurality of points within LSI.

Figures 3A, 3B:
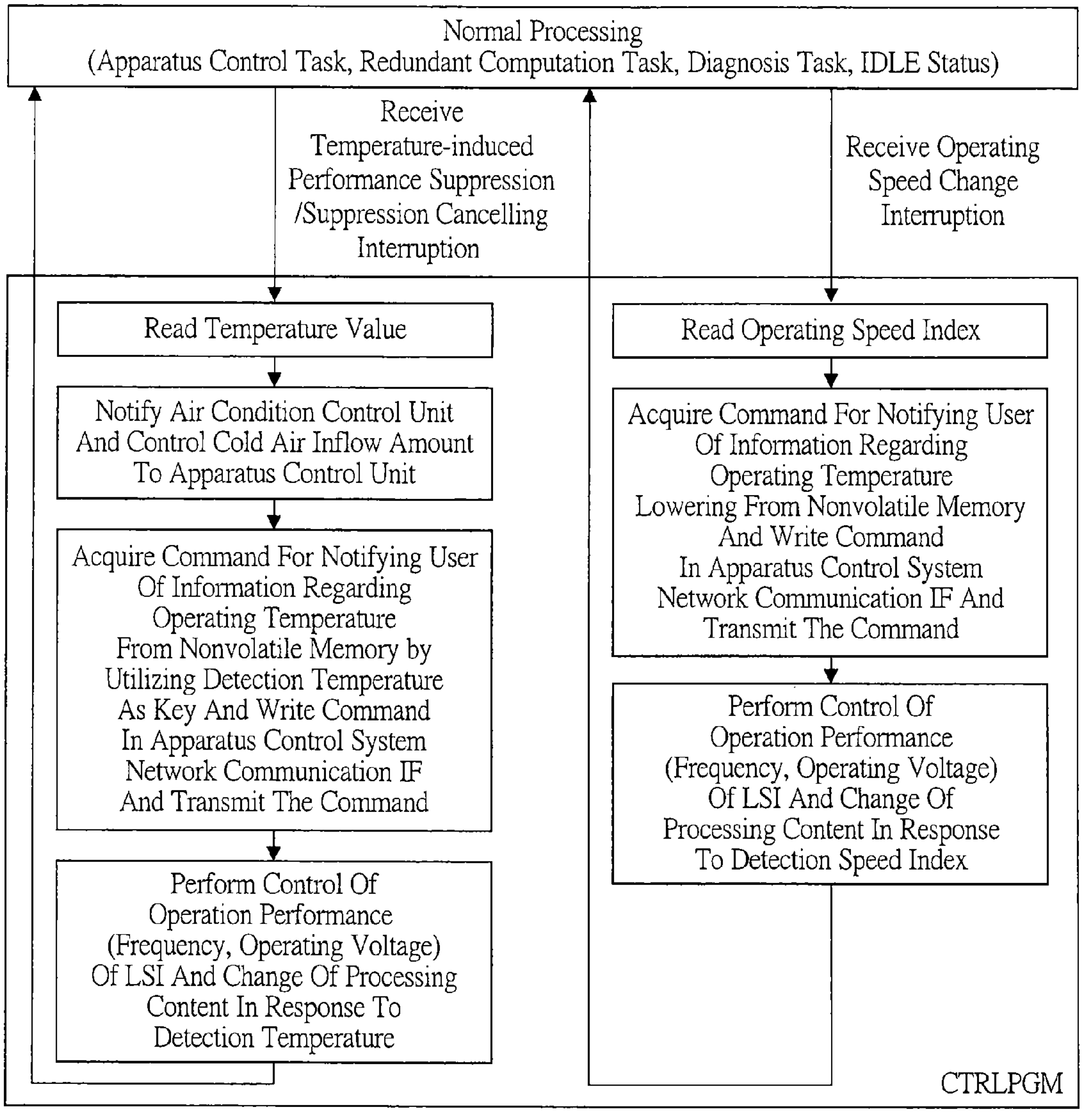
FIG. 3 is a diagram showing an operation of the apparatus control unit.

FIG. 3B shows an example of priority of processings of CPU inside the main LSI of the apparatus control unit. In the main LSI (LSI-M2M) in the apparatus control unit, not only a task for controlling an apparatus such as an engine or a brake but also a redundant computation task for improving reliability and a diagnosis task for examining whether or not each function operates normally are executed. In the present invention, an LSI status reflection task is executed beside these tasks. This task performs control of production/issuance of an LSI status notification command to the information processing system and control of its own processing performance (operation clock frequency or power source voltage) of LSI based on the temperature information obtained from the temperature monitoring circuit TS, the operation speed information obtained from the operation speed monitoring circuit DS, and the like. The LSI status reflection task is lower in priority than the apparatus control task or the redundant computation task to be controlled in real time and execution of the LSI status reflection task is put in a waiting state during execution of the apparatus control task or the redundant computation task. On the contrary, when an interruption for execution of the apparatus control task or the redundant computation task is issued during execution of the LSI status reflection task, the LSI status reflection task is interrupted so that the apparatus control task and the redundant computation task is executed. The LSI status reflection task is higher in priority than the diagnosis processing task so that the interrupted LSI status reflection task is executed even during execution of the diagnosis processing task, but the diagnosis processing task low in priority is put in a waiting state during execution of the LSI status reflection task. Thereby, tasks those required real-time processing, such as tasks required for vehicle running can be executed without being affected by addition of the LSI status reflection task. These tasks are stored in the nonvolatile memory MEM-M2 in the example shown in FIG. 2. The apparatus control task, the redundant computation task, and the diagnosis processing task are included in a user program (USRPGM) and the LSI status reflection task corresponds to CTRLPGM.

FIG. 3A is an operation flowchart of the LSI status reflection task (CTRLPGM). This task is executed upon reception of the temperature-induced performance suppression/suppression cancelling interruption issued when temperature change crossing the set time occurs or upon reception of an operation speed change notification interruption issued when an operation speed change crossing a set operation speed index value occurs. For example, upon reception of the temperature-induced performance suppression interruption, the main CPU (CPU0) first reads a value obtained from the temperature monitoring circuit TS. Next, the main CPU (CPU0) issues a request for feeding cooling air to the apparatus control unit to an air control (conditioning) unit based on the temperature value. Next, the main CPU (CPU0) performs a processing for issuing a command for notifying a user of information relating to operation temperature. Commands corresponding to a plurality of temperatures are prepared in the memory (MEM-M2) in advance and the main CPU (CPU0) selects a command corresponding to the obtained temperature value from these commands. The main CPU (CPU0) writes the selected command in the apparatus control system network communication IF circuit (IF-MC). IF-MC performs a format conversion of the command so as to correspond to a protocol of the network and it transmits the converted command to the apparatus control system network (MCNW) as an LSI status notification command. Finally, the main CPU (CPU0) controls an operating frequency and an operating voltage in response to the detected temperature. The main CPU (CPU0) lowers the operating frequency and the operating voltage along with a temperature rising. At this time, a change of processing contents is also required to be made according to the operating frequency, and a portion of the apparatus control task or a portion of the redundant computation task is set to a simple processing, and a frequency of the diagnosis task is lowered. A currently-used apparatus control task is made considerably high functional as compared with that of a decade ago, and it has larger computation amount. For example, regarding engine control, a processing amount is increased for optimization of its environmental performance and its motion performance, but a simple processing can be performed by temporarily lowering the environmental performance or the motion performance.

The LSI status reflection task is also activated by the operation speed change interruption. In this case, the main CPU (CPU0) first reads a value obtained from the operation speed monitoring circuit DS. Next, the main CPU (CPU0) performs a processing for issuing a command for notifying a user of information relating to the operation speed. Commands corresponding to operation speed index values are prepared in the memory (MEM-M2) in advance and the main CPU (CPU0) selects a command corresponding to the obtained operation speed index value from these commands. The main CPU (CPU0) writes the selected command in the apparatus control system network communication IF (IF-MC). IF-MC performs a format conversion of the command corresponding to a protocol of the network and transmits the converted command. Finally, the main CPU (CPU0) controls the operating frequency. When the main CPU (CPU0) lowers the operating frequency, it performs a processing such as simplification of processing contents, frequency lowering, or omission like the time of temperature-induced performance suppression/suppression cancelling interruption. A simple processing program (SMPLPGM) applied for simplifying the processing contents is prepared in MEM-M2 in advance.

Figure 9:
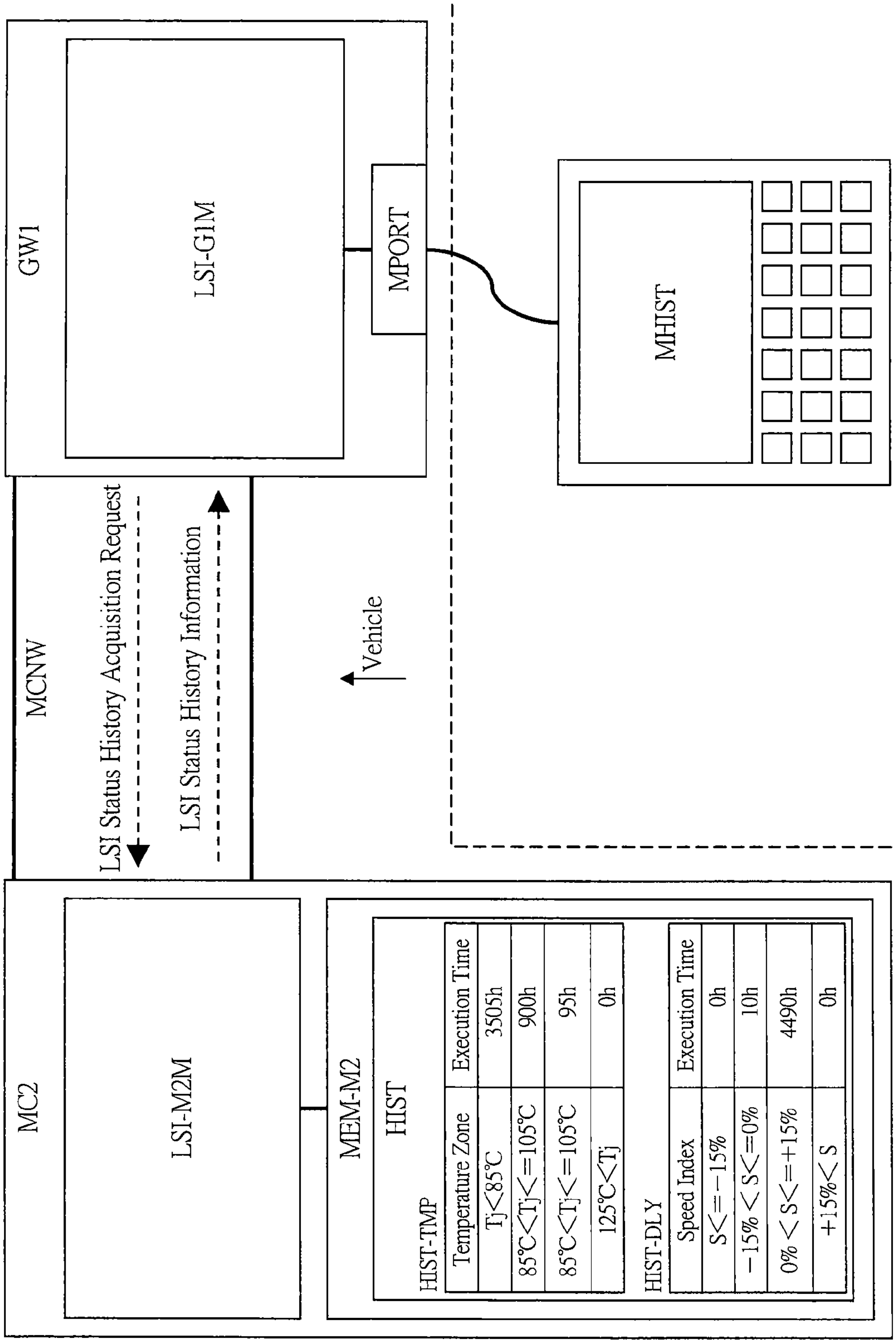
FIG. 9 is a diagram showing an LSI status history acquisition configuration.

In addition, when a total time where a temperature of an LSI is equal to or more than a certain value exceeds a designated value based on execution temperature history information (HIST) shown in FIG. 9, the LSI status reflection task (CTRLPGM) may be executed. The execution temperature record information (HIST) is stored in MEM-M2 in the example shown in FIG. 2. The LSI status reflection task issues a command for notifying the vehicle occupant of corresponding LSI status to the information processing unit like described above. Since a time where LSI is in high temperature state influences the reliability largely, this function which can notify the vehicle occupant of a possibility of a reliability lowering is useful.

Many of the apparatus control units include the sub-LSI for ensuring reliability (LSI-M2S in FIG. 2) and it is thought that part of the processings is transferred from the main LSI (LSI-M2M) to the sub LSI-M2S in order to reduce the processing amount in the main LSI (LSI-M2M). For that purpose, a simple processing program (SMPLPGM2) for executing a processing to be transferred is prepared in a part of a ROM area inside LSI-M2S (FIG. 2). When transfer of a processing is performed, interruption is issued from the main LSI to the sub LSI so that a request is sent to the sub LSI to start the processing. Thereby, even if an abnormality occurs in the main LSI, compensation can be obtained by the sub LSI, an emergency situation such as becoming impossible to drive can be avoided so that a vehicle occupant or a driver can drive the vehicle up to a maintenance place. However, since part of processings is simplified in the state of using the sub LSI, such a state can be said to be an abnormal state as compared with the case where a normal processing is performed only by the main LSI. According to the present invention, since it is possible to notify a vehicle occupant of such a fact that abnormality has occurred in the main LSI via the information processing system specifically, the vehicle occupant can make the vehicle undergo maintenance service immediately so that the vehicle can be recovered to the normal state in the early stage.

Figure 8:
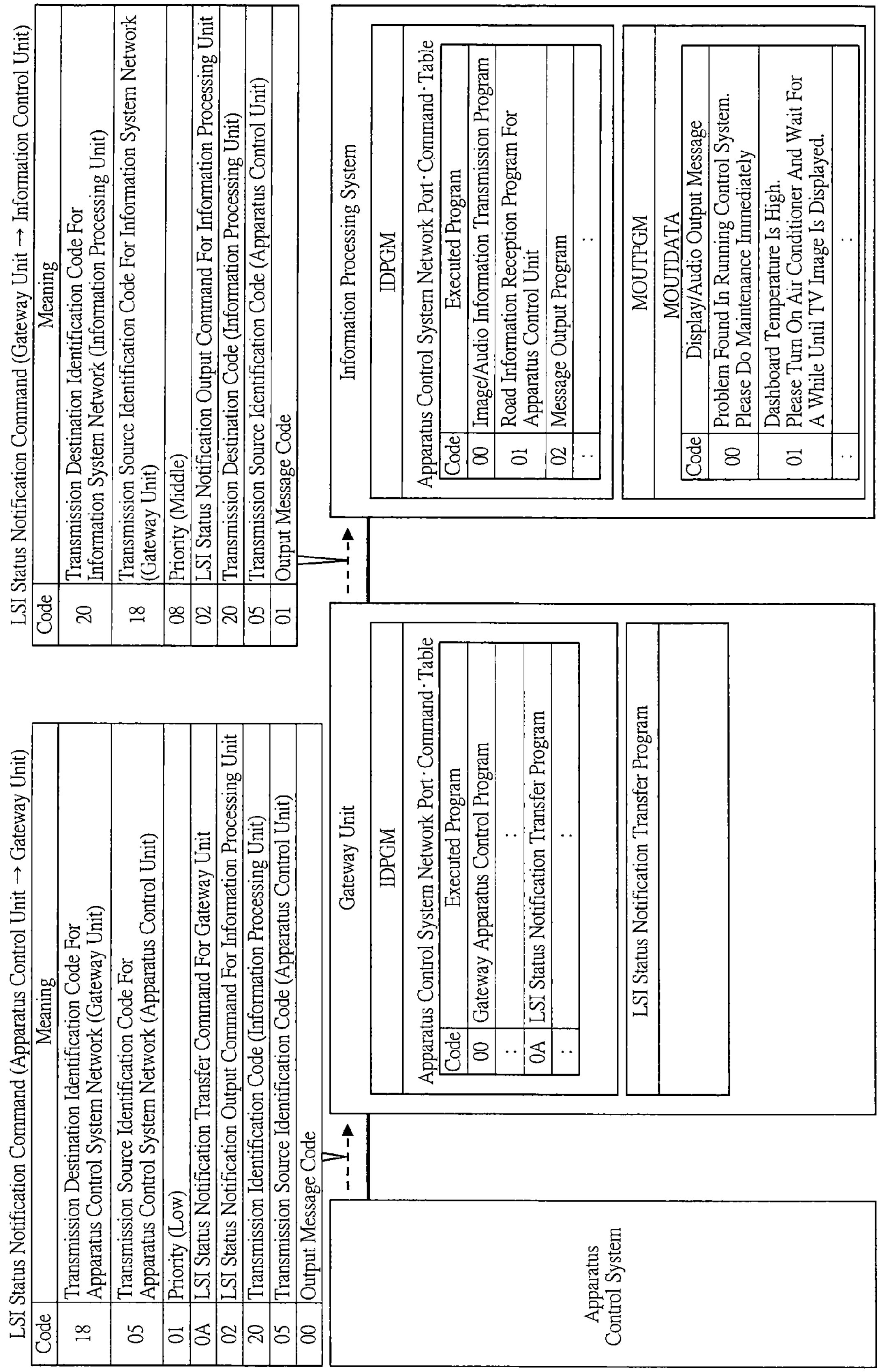
FIG. 8 is a diagram showing LSI status notification commands.

One example of LSI status notification commands transmitted by the apparatus control unit is shown in FIG. 8. The LSI status notification commands include a code showing a transmission destination and a transmission source within the apparatus control system network, a priority in the apparatus control system network, a transfer command used by a mediating gateway unit, an LSI status notification command used in the information processing unit, a code indicating transmission destination and transmission source of an LSI status notification command, and an output message. That is, the apparatus control unit does not transmit a message itself of which a vehicle occupant is notified using the user interface of the information processing system but it transmits a code obtained from the message. In order to provide more specific information to the vehicle occupant, a data amount of the message must be increased. However, transmission of a large amount of data causes increase of burden on the apparatus control system network so that the apparatus control network system connected with many of the apparatus control units required for real time property such as engine control or brake control is influenced largely. Therefore, in the present invention, only a small amount of data is transferred by coding a message so that it becomes possible to transmit the data utilizing a gap in the apparatus control system network.

<Apparatus Control System Network>

The apparatus control system network shown in FIG. 1 has a mechanism for satisfying a real-time processing characteristic of apparatus control which performs a processing within a predetermined time. The apparatus control system network according to the present embodiment is provided with an arbitration system 1 for ensuring real time properties of communications routinely performed by respective apparatus control units and an arbitration system 2 for performing non-steady communication, and the apparatus control system network uses these arbitration systems in a cyclic switching manner. The arbitration system 1 assigns right to use the network to each network node (the apparatus control unit or the gateway unit) at a predetermined time period. In the arbitration system 2, right to use the network is assigned to a network node which has issued a network use request with the highest priority (priority signal) in the priority signals respectively outputted by the respective apparatus control units LSI and the gateway LSI in a time zone selected by the arbitration system 2 without predetermining a network node using the network.

The apparatus control unit uses the arbitration system 2 when transmitting an LSI status notification command via the apparatus control system network. Most of information flowing through the apparatus control system network is for communication between apparatus control units and it is high in real-time property since it relates to such an event as controlling an engine in accordance with a state of a vehicle body. An LSI status related information notification command is for notification to a human and it may be low in real time property as compared with the communication between apparatus control units. Therefore, communication of the LSI status related information notification command is performed in a state that priority of the LSI status relating information notification command has been lowered than that of the communication between apparatus control units. It is possible to determine priority freely by using the arbitration system 2. That is, when an abnormality with high emergency occurs, the apparatus control system network can be used in preference to communication between the apparatus control units with low emergency. Since communications between apparatus control units required to have a real-time property can use the apparatus control system network preferentially, it is possible to reduce influence on communications between apparatus control units required to have a real-time property.

<Gateway Unit>

As shown in FIG. 1, a configuration of the gateway unit includes a communication interface circuit (IF-MC) for the apparatus control system network, a communication interface circuit (IF-IC) for the information system network, CPU, and an interruption controller (INTC). When a write in IF-MC inside LSI-G1M is generated from the apparatus control system through the apparatus control system network, data reception completion interruption is generated in CPU inside the gateway unit LSI (LSI-G1M). At this time, CPU determines whether or not the received data is the LSI status notification command, and it transfers the received data to the information processing unit when the determination is affirmative.

Figures 4A, 4B:
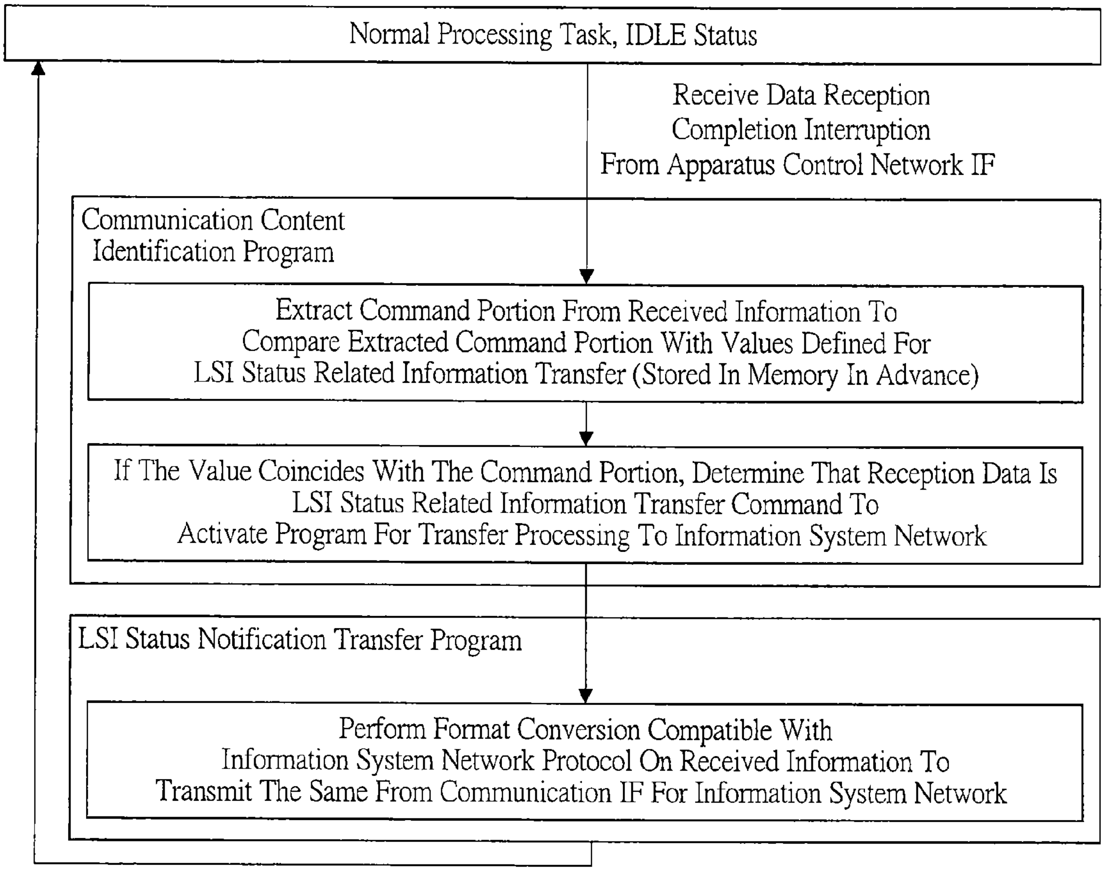
FIG. 4 is a diagram showing an operation of a gateway unit.

A processing flowchart is shown in FIG. 4A. When CPU receives data reception completion interruption according to the processing priority, a communication content identifying program (IDPGM) is activated. The communication content identifying program extracts a command portion from the reception data to compare the same with codes of an apparatus control system network port command table prepared within the memory in advance, thereby determining command content. Program information corresponding to command codes is described in the command table (FIG. 8). When the command portion is determined as a LSI status notification transfer command, the CPU executes an LSI status notification transfer program indicated by the command table. This program performs a format conversion of the received LSI status notification command to a format adaptable to the information system network to perform a write to IF-IC.

One example of LSI status notification commands transmitted by the gateway unit is shown in FIG. 8. The commands include a code indicating a transmission destination and a transmission source inside the information system network, priority in the information system network, an LSI status notification command used in the information processing unit, a code indicating a transmission destination and a transmission source of the LSI status notification command, and an output message code.

Processing priority of the main LSI of the gateway unit is shown in FIG. 4B. In this example, the gateway unit executes a normal task such as a task controlling a meter apparatus and the like, or a communication task between different networks, or a diagnosis task confirming whether there is not a failed portion. The priority of the LSI status notification transfer task executed by the LSI status notification transfer program is set to be lower than that of the normal processing task and be higher than that of the diagnosis task so as not to lower the real time property of the normal processing task.

<Information System Network>

The information system network assigns a right to use according to control similar to the arbitration system 2 of the apparatus control system network according. The information system network has a feature of transmitting a relatively large volume of data such as image information in real time, and it allows transfer with a transfer length longer than that of the apparatus control system network. Since the data amount of the LSI status notification command is considerably smaller than the data amount in the information processing system, the priority of the LSI status notification command is set to be equal to or higher than that of the information processing system command. Thus, the priority of the LSI status notification command is different between the apparatus control system network and the information system network and change of the priority is performed by LSI in the gateway unit. Thereby, even if communication is performed through two different networks, priorities conforming to the respective networks can be provided so that data transfer can be performed at a desired timing.

<Information Processing Unit>

Figure 5:
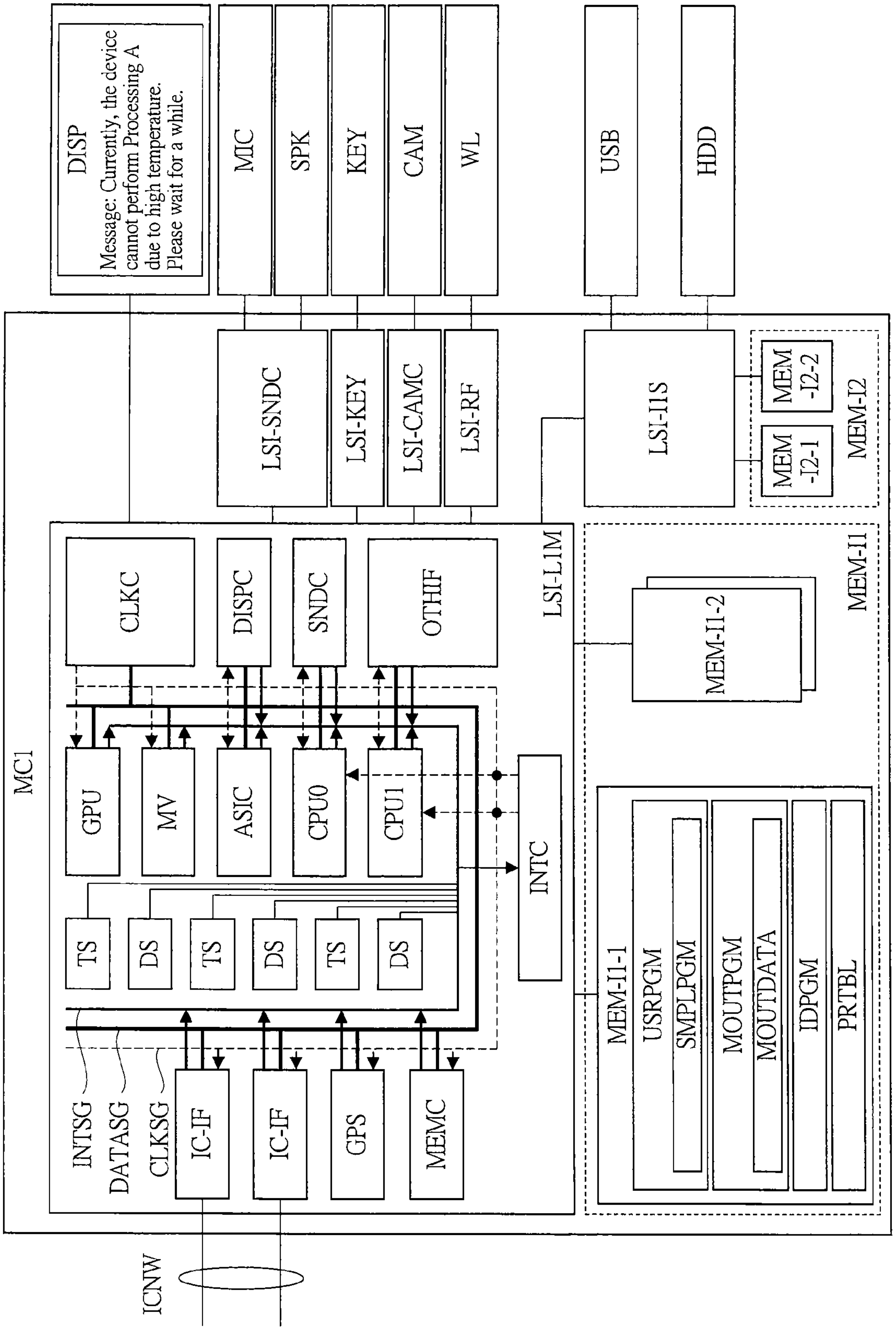
FIG. 5 is a block diagram of an information processing unit.

FIG. 5 shows one example of the information processing unit. The information processing unit is equivalent to IC1 shown in FIG. 1. The information processing unit includes a main LSI (LSI-I1M), a sound LSI (LSI-SNDC) supplementing function, a key input LSI (LSI-KEY), a camera LSI (LSI-CAMC), a wireless LSI (LSI-RM), a sub LSI (LSI-I1S) mounting a product-dependent part such as an USB, memories (MEM-I1-1 and MEM-I1-2) associated with the main LSI, and memories (MEM-I2-1, MEM-I2-2) associated with the sub LSI. MEM-I1-1 and MEM-I1-2 are nonvolatile memories, and MEM-I1-2 and MEM-I2-2 are SDRAMs. The main LSI includes two CPUs (CPU0 and CPU1), a dedicated circuit block (ASIC), a moving picture processing circuit (MV) such as MPEG-Codec, a graphics controller (GPU), a screen display control block (DISPC), a sound/audio input and output control block (SNDC), a clock control circuit (CLKC), other interface circuits (OTHIF), a GPS block (GPS), a memory controller (MEMC), an interruption controller (INTC), and communication IFd (IF-IC) for connection to the information system network. This LSI itself has a circuit TS sensing temperature of the LSI and a circuit DS observing operation speed of the LSI as the LSI status monitoring circuit (SNS).

Figure 7:
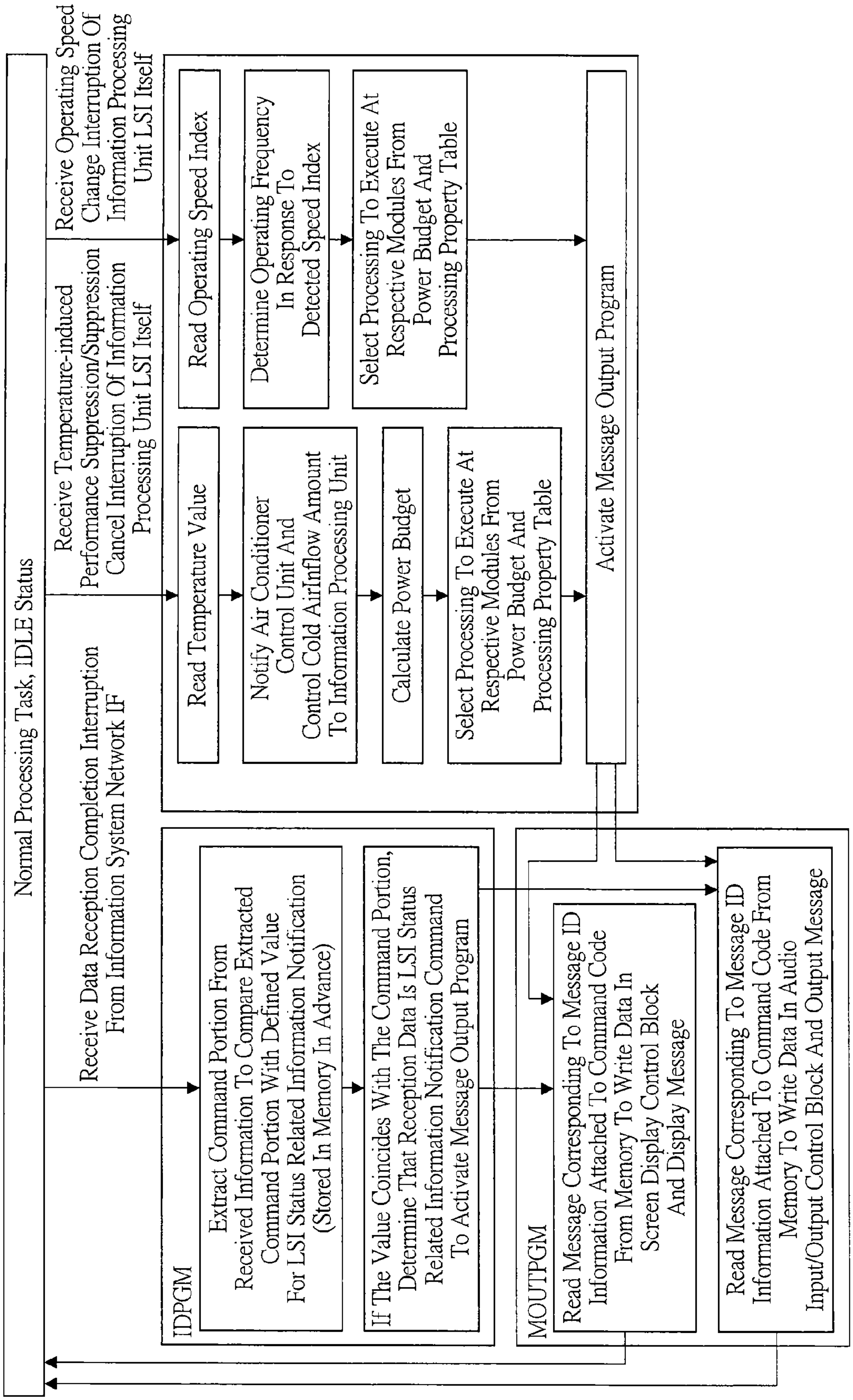
FIG. 7 is a diagram showing an operation of the information processing unit.

A processing flowchart relating to the LSI status notification is shown in FIG. 7. The processing relating to the LSI status notification is generated upon reception of data reception completion interruption from the information system network IF circuit (IF-IC), upon reception of temperature-induced performance suppression/suppression cancelling interruption of the information processing unit LSI itself, and upon reception of operation speed change interruption of the information processing unit LSI itself.

When CPU inside the information processing unit LSI receives data reception completion interruption according to the processing priority, the communication content identifying program (IDPGM) is first activated. The communication content identifying program extracts an LSI status notification output command for information processing unit (FIG. 8) from the received LSI status information notification command to compare the extracted command with codes of an information system network port command table prepared inside the memory in advance, thereby determining command content. Program information corresponding to the command codes is stored in the command table (FIG. 8). When it is determined that the extracted command is the LSI status notification command, CPU inside the information processing unit LSI executes a message output program (MOUTPGM) instructed by the command table. The message output program extracts an output message code included in the received LSI status notification command to search for the outputted message table prepared inside the memory in advance with utilizing the extracted message code as index. The message output program extracts a corresponding message from the output message table to output the message code from an image display device and a speaker for notification to a user.

Upon reception of a temperature-induced performance suppression/suppression cancelling interruption of the information processing unit LSI itself, the LSI status reflection task is performed like the case of the abovementioned apparatus control unit (FIG. 8). The CPU inside the information processing unit LSI reads the temperature value of LSI to calculate power budget for suppressing the temperature within a limited temperature range, performs a selection of a processing to be performed according to the budget, and performs control of the operating frequency and the voltage. FIG. 6 shows an example of a management table of processing (corresponding to PRTBL in FIG. 5) possessed by the LSI of the information processing unit. The table includes powers required when respective processings are performed, modules (CPU and the like) which can perform processings, priority of processings, and the like. In the present embodiment, when the power budget is small and the processing performance is suppressed, user input corresponded processings such as a communication processing with the control unit and correspondence to an apparatus operation performed by a vehicle occupant and the LSI status notification processings are performed in high priority, but the priority of an entertainment processing such as TV or music generation is low. At this time, a processing that is low in priority may be interrupted or stopped after notifying the vehicle occupant.

Also, when the processing performance is suppressed, simplification of processing content is also performed. As an example of a specific method, there is such a method that only selected frame images are processed (to reduce a frame rate) without performing arithmetic (decode, encode, or the like) and display processings of all frame images. In a moving picture compression technique, reference frames comprising one frame information item and frames using not only its own frame but also information of the reference frame are often included in frames, so that, when a frame rate is to be reduced, a processing to the reference frames is selected preferentially. In the LSI of the information processing unit having the screen display function and the audio output function, the LSI itself controls the display device to perform notification to a vehicle occupant without interposing a network.

Upon reception of an operation speed change interruption of the information processing unit LSI itself, the LSI status reflection task is performed. As shown in FIG. 8, although a processing similar to the case of the apparatus control unit is performed, in the LSI of the information processing unit having the screen display function and the audio output function, the LSI itself controls the display device to perform notification to a vehicle occupant without interposing a network.

<Notification Contents to User>

Examples of notification content to a user will be described below.

Problem found in cruise control system. Please do maintenance immediately.

Because dashboard is at high temperature, TV program cannot be displayed for a while. Please wait while turning ON air conditioner.

Currently, some of processings cannot be performed due to high temperature in the information processing unit. Please select one from the following processings.

<Other LSI Status Monitoring Means>

A circuit for observing a disconnection failure of an LSI wiring may be included as LSI status monitoring means. A disconnection failure monitoring circuit BS detects a disconnection utilizing a disconnection failure test circuit used before shipping. When disconnection has been detected, the other apparatus control units and the information processing unit are notified of such a fact that disconnection has been detected via the apparatus control system network in the same manner as the LSI status reflection task. Further, notification is issued to the sub LSI for reliability compensation inside the apparatus control unit and the sub LSI produces apparatus control information instead of the main LSI.

<External Read of LSI Status>

The vehicle electronic system of the present invention is also provided with a function taking LSI status information externally. With the configuration, a state where an error has occurred can be determined at a maintenance time so that repair can be made efficiently. FIG. 9 is a configuration diagram for connecting an external apparatus for LSI status history reading (MHIST) to the gateway unit to read the LSI status history of the apparatus control unit LSI.

The external apparatus for reading LSI status history (MHIST) transmits an LSI status history acquiring request to the main LSI (LSI-G1M) of the gateway unit via an external apparatus port (MPORT) of the gateway unit. The LSI-G1M issues interruption to CPU inside the LSI and the CPU executes an LSI status history acquisition request producing program. The program issues the LSI status history acquisition request to the apparatus control unit LSI included in the received data from the external apparatus for reading LSI status history.

In order to realize this, LSI (LSI-M2M) in the apparatus control unit retains information obtained by using the LSI status monitoring circuit (the temperature monitoring circuit TS and the operation speed monitoring circuit DS) in a nonvolatile memory. An example of retained content is shown in FIG. 9. The retained content includes execution temperature history information and execution speed history information. The execution temperature history includes temperature history information (HIST-TMP) where execution time has been recorded for each temperature zone of LSI and the execution speed history includes operation speed history information (HIST-DLY) where execution time has been recorded for each operation speed index value of LSI. When LSI-M2M receives an LSI status history acquisition request, it transmits these history information items to LSI-G1M.

In the present embodiment, such a configuration is adopted that the LSI status history is assigned to the apparatus control unit and reading is performed from the gateway unit via the apparatus control system network. According to this configuration, a plurality of apparatus control units are not required to put their own status histories on the apparatus control system network so that the network load can be reduced. Such a configuration can be adopted such that a small nonvolatile memory is prepared in the gateway unit so that a transmission source identification code for the apparatus control system network of the apparatus control unit issuing the LSI status notification commands shown in FIG. 8 is stored in the small nonvolatile memory. Many apparatus control units for break control, engine control, and the like are connected to the current apparatus control network. Accordingly, by storing the transmission source identification code for the apparatus control system network and confirming an apparatus control unit where a failure has occurred before starting maintenance work, it becomes unnecessary to examine LSI status histories regarding all the apparatus control units.

Figure 10:
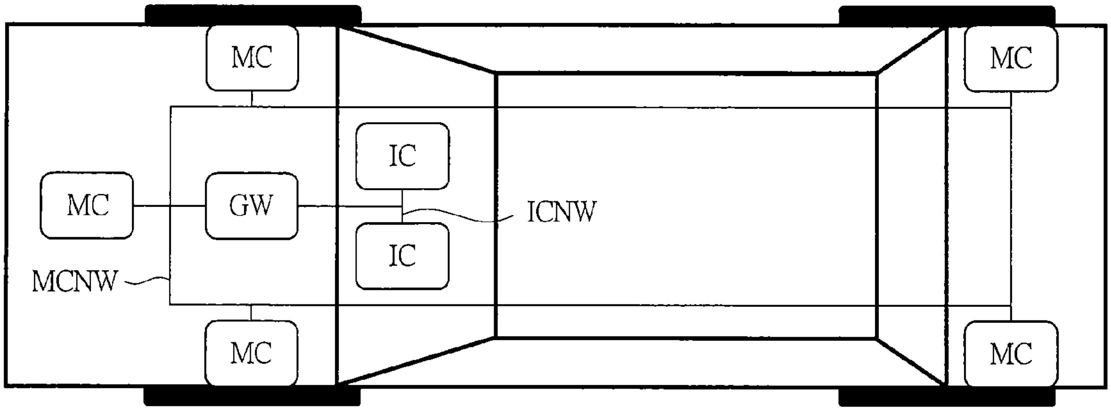
FIG. 10 is a diagram of a network configuration example of a vehicle to which the present invention is applied.

FIG. 10 is a diagram of an automobile to which the present invention is applied. The apparatus control units MC are arranged near movable apparatus parts to be controlled (brakes and an engine in FIG. 10), respectively, and the information processing units IC are arranged near corresponding user interfaces (a car navigation device and an audio device). In the present embodiment, the gateway unit is arranged in a console box. In the automobile according to the present embodiment, for example, when an abnormality has occurred in the apparatus control unit performing brake control, the occurrence of abnormality is transmitted to the information control unit IC via the gateway GW, and a message is transmitted to a vehicle occupant by using the car navigation apparatus and the audio apparatus. Note that, FIG. 10 is illustrated in a simplified manner for description and so the numbers of the apparatus control units MC and the information processing units IC provided inside the automobile may exceed the numbers illustrated in FIG. 10, and the network configuration is not limited to the illustrated one.

While the present invention has been described in the foregoing according to the present embodiment, main effects of the present invention described in the present application are as follows. Safety and performance of vehicle electronics can be improved. Introduction of electronics of vehicle control has progressed and these vehicle electronic apparatuses are required to have a considerably high reliability. However, it is impossible that electronic apparatuses achieve 100% reliability. It is same to LSIs included in these apparatuses. When a problem has occurred in unexpected circumstances or when a possibility of occurrence of a problem grows up, the present invention notifies a vehicle occupant of such a situation and notifies the vehicle occupant of a necessity of early maintenance in order to improve safety. There is such an aspect that reliability is excessively emphasized and excessive countermeasure for reliability improvement is taken, and it results in reduction of performance. For example, performance is excessively suppressed more than necessary in order to suppress temperature rising of LSI or heat radiating mechanism for preventing temperature of parts from rising, which results in increase of the weight of a vehicle body. These problems can be solved by improvement of reliability achieved by the present invention.

What is claimed is:

1. A vehicle electronic system comprising:

a plurality of apparatus control unit LSIs which include a monitoring circuit monitoring temperature information and operation speed information of the apparatus control unit LSI, and controls a corresponding movable apparatus part;

a plurality of information processing LSIs which control an image display device or an audio output device;

an apparatus control system network connected to the plurality of apparatus control unit LSIs;

an information processing system network connected to the information processing LSIs; and a gateway LSI connected between the apparatus control system network and the information processing system network, wherein the plurality of apparatus control unit LSIs notify the gateway LSI of first abnormality information via the apparatus control system network upon detecting an operation abnormality based on a monitored result obtained by the monitoring circuit, the gateway LSI notifies the information processing LSI of second abnormality information based on the first abnormality information via the information processing system network upon receiving the first abnormality information from one of the plurality of apparatus control unit LSIs, and the information processing LSI outputs a message based on the second abnormality information to the image display device or the audio output device upon receiving the second abnormality information.

2. The vehicle electronic system according to claim 1, wherein the first and second abnormality information include content identification codes, the information processing LSI includes a table associating the content identification code with corresponding messages and looks up the content identification code and the table to control the image display device or the audio output device messages corresponding to the content identification codes are outputted.

3. The vehicle electronic system according to claim 1, wherein each of the plurality of apparatus control unit LSIs executes an apparatus control task for controlling the movable apparatus part and an LSI status reflection task for transmitting the first abnormality information to the gateway LSI, and priority of the apparatus control task is higher than that of the LSI status reflection task, and when a notification of interruption for executing the apparatus control task is issued during execution of the LSI status reflection task, the execution of the LSI status reflection task is interrupted and the apparatus control task is executed.

4. The vehicle electronic system according to claim 1, wherein the apparatus control system network uses a first arbitration system which assigns a right of use to each of the plurality of apparatus control unit LSIs and the gateway LSI connected to the apparatus control system network at a predetermined time period, and a second arbitration system which assigns a right of use according to priority signals outputted by the plurality of apparatus control unit LSIs and the gateway LSI respectively connected to the apparatus control system network in a switching manner, and the first abnormality information is transmitted to the apparatus control system network during use of the second arbitration system.

5. The vehicle electronic system according to claim 4, wherein, when a first apparatus control unit LSI of the plurality of apparatus control unit LSIs issues a first request for transmitting the first abnormality information and a second apparatus control unit LSI of the plurality of apparatus control unit LSIs issues a second request for transmitting predetermined information of another apparatus control unit LSI, the apparatus control system network receives the second request preferentially.

6. The vehicle electronic system according to claim 1 further comprising a plurality of sub LSIs connected to corresponding apparatus control unit LSIs of the plurality of apparatus control unit LSIs, wherein, when detecting an operation abnormality based on a monitored result obtained by the monitoring circuit, each of the plurality of apparatus control unit LSIs lower an operating frequency or an operating voltage and also replaces a first program corresponding to a task to be processed by a simplified program whose processing amount is small to execute the simplified program, and causes a corresponding sub LSI of the plurality of sub LSIs to perform a processing of a part of the first program.

7. The vehicle electronic system according to claim 1, wherein each of the plurality of apparatus control unit LSIs acquires operating time history information for each temperature monitored by the monitoring circuit and transmits the first abnormality information when an accumulated execution time at a predetermined temperature abnormality exceeds a predetermined time.

8. The vehicle electronic system according to claim 1 further comprising a plurality of nonvolatile memories corresponding to the plurality of apparatus control unit LSIs, respectively, wherein each of the plurality of apparatus control unit LSIs stores operating time history information for each temperature monitored by the monitoring circuit in a corresponding nonvolatile memory of the plurality of nonvolatile memories, and the plurality of nonvolatile memories are accessed by an external output port included in either of the plurality of apparatus control unit LSIs, the information processing LSIs, or the gateway LSI to output the operating time history information.

9. The vehicle electronic system according to claim 1 further comprising:

a plurality of first nonvolatile memories corresponding to the plurality of apparatus control unit LSIs, respectively, and a second nonvolatile memory corresponding to the gateway LSI, wherein each of the plurality of apparatus control unit LSIs stores operating time history information for each temperature monitored by the monitoring circuit in a corresponding nonvolatile memory of the plurality of nonvolatile memories, the first abnormality information includes transmission source information for specifying an apparatus control unit LSI which is a transmission source among the plurality of apparatus control unit LSIs, and upon receipt of the first abnormality information, the gateway LSI stores the transmission source information in the second nonvolatile memory.

10. The vehicle electronic system according to claim 9, wherein the operating time history information and the transmission source information are accessed by an external output port provided to the gateway LSI.

11. The vehicle electronic system according to claim 1, wherein, when a first apparatus control unit LSI of the plurality of apparatus control unit LSIs issues a first request for transmitting the first abnormality information and a second apparatus control unit LSI of the plurality of apparatus control unit LSIs issues a second request for transmitting predetermined information of another apparatus control unit LSI, the apparatus control system network receives the second request preferentially, and, when the gateway LSI issues a third request for transmitting the second abnormality information and a first information processing LSI of the plurality of information processing LSIs issues a fourth request for transmitting predetermined information to another information processing LSI, the information processing system network receives the third request preferentially.

12. A vehicle comprising:

a plurality of apparatus control unit LSIs which include a monitoring circuit monitoring temperature information and operation speed information of the apparatus control unit LSI, and controls a corresponding movable apparatus part;

a plurality of information processing LSIs which control an image display device or an audio output device;

an apparatus control system network connected to the plurality of apparatus control unit LSIs;

an information processing system network connected to the information processing LSIs; and a gateway LSI connected between the apparatus control system network and the information processing system network, wherein the plurality of apparatus control unit LSIs notify the gateway LSI of first abnormality information via the apparatus control system network upon detecting an operation abnormality based on a monitored result obtained by the monitoring circuit, the gateway LSI notifies the information processing LSI of second abnormality information based on the first abnormality information via the information processing system network upon receiving the first abnormality information from one of the plurality of apparatus control unit LSIs, and the information processing LSI outputs a message based on the second abnormality information to the image display device or the audio output device upon receiving the second abnormality information.

* * * * *